Patented Aug. 22, 1939

2,170,439

UNITED STATES PATENT OFFICE 2,170,439

ELASTIC FIBER

Peter J. Wiezevich, Elizabeth, N. J., now by judicial change of name to Peter J. Gaylor, assignor to Standard Oil Development Company, a corporation of Delaware No Drawing. Application April 2, 1936, Serial No. 72,443

5 Claims. (Cl. 28—1)

This invention relates to the production of elastic fibers, threads, filaments, and the like of high stability and superior wearing resistance, and methods for producing the same. It especially deals with the formation of elastic fibers of substantially saturated linear hydrocarbons of high molecular weight suitable for spinning, weaving and knitting into garments and the like.

For most uses, such as for the production of automobile tires, toys, etc., ordinary rubber has been found to be suitable. In the case of fibers or filaments, however, a large amount of surface is exposed, so that even in the presence of inhibitors and vulcanizing agents, deterioration occurs very rapidly, especially in contact with air at high temperature as well as with acid or basic materials encountered in laundering, dyeing, cleaning, and the like. Rubber also possesses an objectionable odor when in fiber form. Hence, ordinary rubber is unsatisfactory for such purposes and its use has been heretofore limited only to articles having normally a very short life.

An object of this invention is to produce odorless woven elastic fabrics and similar materials having the property of maintaining their elasticity for long periods of time without any hardening, chipping, or breaking. Another object of the invention is to produce such fabrics by a simple and efficient method. Other objects will be apparent from the following disclosure.

In my co-pending application, Ser. No. 54,244, filed on December 13, 1935, a substantially saturated hydrocarbon linear polymer of above 15,000 molecular weight was described. Such a product is considerably different from rubber and other polymeric materials and may be obtained by the polymerization of substantially pure isobutylene, preferably as free of straight chain butenes as possible, at low temperatures, e. g. below 0° C. and preferably at —40° C. or even —80° C. or lower. The polymerization is effected by bubbling boron fluoride or a similar reagent through a solution of the isobutylene in ethylene or other similar low boiling solvent. By employing pure reactants and low temperatures, polymers having average molecular weights of 40,000, 80,000, 100,000, 150,000, 180,000, or even 200,000 or 300,000 or more may be prepared. These molecular weights may be most conveniently determined by the viscosity method disclosed by Staudinger and substantially described in his "Hochmoleculare Organische Verbindungen". Berlin (1932).

Another linear substantially saturated high molecular weight hydrocarbon polymer which, although not as suitable as poly-isobutylene, is still useful in this field, is hydrogenated rubber. This material may be produced by hydrogenating a 3% or 5% or even 10% solution of rubber such as smoked sheet and the like, in a solvent such as hydrogenated benzene in presence of a catalyst such as reduced nickel or molybdenum and/or tungsten sulfide with or without carriers at about 150° to 300° or even 400° C.

These linear high molecular weight substantially saturated polymers possess exceptional stability in presence of oxygen, acids, bases and other deteriorating agents encountered in this field. Furthermore, they are not affected by acidic, saline, and similar materials present in perspiration which are detrimental to rubber and are more resistant to the deteriorating effects of repeated laundering, drying, ironing, etc.

The fibers, threads, filaments, and the like are produced either before, during, or after the polymerization step. For instance, it is possible to eject or squirt through a fine orifice a fiber of isobutylene or a solution thereof in ethylene, propylene, hexane, or similar solvent, or as an emulsion in an immiscible solvent, into a vessel containing boron fluoride maintained at low temperature and at atmospheric pressure, or under a pressure of 5, 10, 50, 100, or even 300 or more atmospheres, either in liquid or gaseous phase, with or without a solvent for boron fluoride, such as ethylene, propylene, chlorinated hydrocarbons such as methyl, ethyl, isopropyl, or butyl chlorides, ethylene dichloride, trichlor-ethylene, and the like. In this case the isobutylene stream is polymerized into a fiber, after which it may be dried, washed, and otherwise processed. In some cases it is desirable to employ, as solvent for the boron fluoride, a liquid in which the isobutylene polymer is substantially insoluble, e. g. nitro-hydrocarbons, ketones, alcohols, hydrogen halides, ethyl acetate, and the like.

By extrusion of a polyisobutylene solution through a very narrow slit into a gaseous or insoluble liquid medium, a thin sheet of the polymer may be obtained which can be dried and cut up into fibers of narrow width.

Furthermore, such fibers may be prepared by first polymerizing the isobutylene in a solvent such as ethylene, in which may also be present any desired dyes, pigments, oxidation inhibitors, fillers, plasticizers, and the like. As examples of such materials are ultramarine blue, oil soluble fluorescent dyes such as condensation products of highly cyclic hydrocarbons with $AlCl^3$, as those disclosed in U. S. 1,839,012, 1,868,473, 1,944,851, 1,868,473 or dyes of the acridine type as disclosed in U. S. 1,860,850, amino phenyl benzothiazoles, etc. described in Can. 330,724–5, those in Can. 336,548, and the like, aluminum or similar metal powder, carbon black, oil soluble oxidation inhibitors such as aromatic amines and phenols, aromatic sulfides, phenol sulfides, or disulfides, sulfur, metallo organic compounds, nitro aromatics, paraffin wax, rubber, ethyl abietate, butyl stearate, isopropyl oleate (plasticizers), zinc oxide, indophenol dyes, and the like. However, it is preferable not to incorporate sulfur and amino compounds until after the polymerizing step due to their tendency to inhibit polymerization. Any of the other compounding agents may be likewise added after polymerization.

The isobutylene polymer produced, after evaporation of the ethylene, may be then dissolved in a solvent, or a solvent dissolved therein, depending on the quantity of solvent employed—which may be 1 to 10 or up to 50, 80, or even 95% of the weight of the total solution or dispersion. A water wash or alkali wash to remove excess boron fluoride left in the polymer may be introduced at this point. An oil soluble alkaline agent may also be incorporated in the polymer as for example oil soluble onium bases. During this operation a mixing or kneading action is effective in dispersing the solids, polymer and blending agents heretofore disclosed into the solvent. When a homogeneous dispersion is obtained, it may be ejected or squirted, or if very viscous, it may be extruded through a fine orifice into a bath of a liquid in which the polymer is insoluble, e. g. methyl, ethyl or isopropyl alcohol, acetone, methyl or ethyl acetate, and the like. If desired, some of the ingredients, such as oxidation inhibitors, dyes, etc. may be present in this insoluble bath. The polymer together with some of its compounding agents is coagulated or precipitated out in the form of a thread which may be washed, dried, coated with talc or similar material, woven on the outside with a loose weave of threads of textile material such as those of cotton, silk, regenerated cellulose, cellulose esters or ethers, wool, and the like, and reeled. It may be subsequently woven, spun, or otherwise processed into cloth, fabric, and the like. By this means it is readily possible to prepare threads of 0.005″ to 0.05″ in diameter more or less.

Instead of coagulation in a bath, the polymer solution may be squirted into a flowing stream of air, inert gas such as carbon dioxide nitrogen, or steam, ammonia, etc. cold, warm, or heated to say 100° to 200° or even 300° F. or more, whereby the solvent is driven off, leaving the dry fiber ready for processing. Threads of 0.01″ to 0.004″ or even 0.003″ and sometimes 0.001″ diameter or less may be prepared in this manner.

Another method is to emulsify the polymer and then incorporate the compounding agents previously referred to herein, if desired, and then squirt the emulsion through a nozzle or orifice or similar means into a coagulating bath consisting of an acid, basic or salt solution which destroys the emulsion liberating the polymer in the form of a thread.

In the preparation of emulsions of the polymer hydrocarbons suitable for extrusion into a coagulating bath for the production of threads, an oil soluble emulsifying agent is most desirable. A particularly suitable emulsifier for this purpose is the alkali metal or other metal oil-soluble sulfonate soap known as the "mahogany" sulfonate obtained from acid treatment of petroleum, freed from inorganic materials and other substances which impair its emusifying properties. Another emulsifying agent of some value for this purpose is the soap of Montan wax acids or their derivatives. With these latter agents, it is desirable to employ therewith a soap of a lower fatty acid such as stearic acid.

With sufficient pressure (2,000 to 50,000 or even 100,000 lbs. per square inch) and preferably at elevated temperature (100–300° F.) it is possible to extrude the polymer itself, with or without its compounding agents, into a thread. Such a process is satisfactory for threads of larger diameter, say those of 0.05″ to 0.46″ diameter or higher. The polymer may be kneaded with a small amount of solvent such as pentane, propane, tetralin, etc. to obtain additional plasticity, if desired.

Another satisfactory, though more expensive method is to roll the high molecular weight polymer on a rubber mill or to extrude a sheet through a narrow opening to the thickness of the fiber, say 0.5″, 0.05″, or even 0.005″ or less, and then to cut strips of the same size or possibly somewhat wider to give threads which are more rectangular than spherical in shape.

In the preferred process for producing the polymer fiber the solution of the polymer is squirted upwardly through a fine orifice into a bath of precipitating liquid of sufficient height to cause substantially complete precipitation to the fiber form before the latter reaches the surface of the bath. The fiber may then be washed, dried and otherwise processed. The precipitating bath is to be gradually removed at the bottom while fresh precipitant is continuously supplied at the top (in this case the precipitant is heavier than the polymer solvent).

One of the most desirable features of the polymers employed in this invention is that they are affected only very slightly in consistency with changes in temperature, in this respect differing from other plastics, and for this reason involving very little difficulty in sticking, crumpling, and other undesirable phenomena encountered in laundering operations. Furthermore, these polymers when properly prepared show very little breakdown in molecular weight when subjected to stress, as for instance encountered in milling, extrusion, etc. On the other hand, rubber breaks down considerably in molecular weight, thereby losing its most valuable elastic and non-fluid characteristics. Another very useful property of these polymers is the fact that they require no vulcanization as does rubber to exhibit satisfactory elasticity as well as long life. Hence it is not necessary to add foul smelling vulcanizing agents such as sulfur chlorides, and the like, which are now absolutely necessary.

For the preparation of threads and filaments, it has been found most desirable to employ those saturated hydrocarbon polymers having an average molecular weight between 100,000 and 200,000 or 250,000 or higher. Such threads, when woven, spun, or otherwise covered on the outside with fibers of textile materials are especially suitable for the preparation of fabrics for use in foundation garments, extensible linings for hats, and the like. In most cases it is only necessary to wind one or two textile fibers in one direction opposite one or two fibers in the opposite direction. Such a thread coating will allow the fiber to stretch 5 to 20 to 40 or even 60% or more of its original length before actual stretching of the textile thread occurs.

It is not intended that the invention be limited by any of the examples given but only by the appended claims in which it is intended to cover all novelty inherent in the invention as broadly as the prior art permits.

I claim:

1. An article of manufacture comprising an odorless fiber of polyisobutylene having an average molecular weight of 100,000 to 250,000 suitable for weaving into fabrics.

2. An article of manufacture comprising a woven fabric comprising substantially fibers of polyisobutylene having an average molecular weight of about 100,000 to 250,000.

3. An article of manufacture comprising an odorless, oxygen-resisting fiber of a substantially saturated linear aliphatic hydrocarbon polymer of over 40,000 average molecular weight.

4. An article of manufacture comprising a fiber of polyisobutylene extruded in solid form having a diameter of 0.002 to 0.3 inch and an average molecular weight of above about 40,000.

5. An article of manufacture comprising essentially a fiber of a substantially saturated linear polymer of an aliphatic iso-olefine of the type exemplified by isobutylene.

PETER J. WIEZEVICH.